US012351068B2

(12) United States Patent
Kurimoto et al.

(10) Patent No.: US 12,351,068 B2
(45) Date of Patent: Jul. 8, 2025

(54) POWER SUPPLY SYSTEM

(71) Applicant: DENSO CORPORATION, Kariya (JP)

(72) Inventors: Masayuki Kurimoto, Kariya (JP); Katsuyuki Mori, Kariya (JP)

(73) Assignee: DENSO CORPORATION, Kariya (JP)

( * ) Notice: Subject to any disclaimer, the term of this patent is extended or adjusted under 35 U.S.C. 154(b) by 349 days.

(21) Appl. No.: 17/658,220

(22) Filed: Apr. 6, 2022

(65) Prior Publication Data

US 2022/0324349 A1    Oct. 13, 2022

(30) Foreign Application Priority Data

Apr. 12, 2021  (JP) ................................ 2021-067358

(51) Int. Cl.
*B60L 58/18* (2019.01)
*B60W 60/00* (2020.01)
*H02J 7/00* (2006.01)
*H02J 9/06* (2006.01)

(52) U.S. Cl.
CPC ......... *B60L 58/18* (2019.02); *B60W 60/0015* (2020.02); *B60W 60/0053* (2020.02); *H02J 7/0013* (2013.01); *H02J 7/0047* (2013.01); *H02J 9/061* (2013.01)

(58) Field of Classification Search
CPC ....... B60L 58/18; H02J 7/0013; H02J 7/0024; H02J 9/061; H02J 1/108
See application file for complete search history.

(56) References Cited

U.S. PATENT DOCUMENTS

| | | | | |
|---|---|---|---|---|
| 6,476,519 B1 * | 11/2002 | Weiner | ..................... | H02J 9/002 307/29 |
| 2009/0118903 A1 | 5/2009 | Kimura et al. | | |
| 2017/0080883 A1 | 3/2017 | Yasunori et al. | | |
| 2017/0225635 A1 * | 8/2017 | Obayashi | ................. | F02B 39/10 |
| 2017/0349048 A1 * | 12/2017 | Nakayama | ................. | B60L 3/04 |
| 2018/0009400 A1 * | 1/2018 | Lee | ......................... | B60R 16/03 |
| 2018/0354436 A1 * | 12/2018 | Sato | ........................ | H02H 7/268 |

(Continued)

FOREIGN PATENT DOCUMENTS

| | | | |
|---|---|---|---|
| JP | 2009116576 A | | 5/2009 |
| JP | 2018191440 A | * | 11/2018 |
| JP | 2020-29200 A | | 2/2020 |

OTHER PUBLICATIONS

Machine translation of JP-2018191440-A (Year: 2018).*

*Primary Examiner* — Navid Z. Mehdizadeh
*Assistant Examiner* — Caitlin R McCleary
(74) *Attorney, Agent, or Firm* — Maschoff Brennan (57) ABSTRACT

A power supply system includes: a first in-vehicle unit and a second in-vehicle unit; a first supply line normally supplying electric power from the first power supply unit to the first in-vehicle unit; a second supply line normally supplying electric power from the second power supply unit to the second in-vehicle unit; a crossover line relaying electric from the first supply line to the second supply line to be able to supply electric power under abnormal conditions; a power supply rectifier provided on a second power supply unit side of the relay supply line on the second supply line and configured to pass power to the second in-vehicle unit; a crossover rectifier provided on the crossover line and configured to pass power from the first supply line side to the second supply line; and a relay unit.

22 Claims, 8 Drawing Sheets

(56) References Cited

U.S. PATENT DOCUMENTS

| | | | | |
|---|---|---|---|---|
| 2019/0165603 A1* | 5/2019 | Matyac | ..................... | H02J 3/38 |
| 2019/0283696 A1 | 9/2019 | Toda | | |
| 2020/0343763 A1* | 10/2020 | Wataru | .................. | B60L 3/0046 |
| 2020/0373627 A1* | 11/2020 | Moriya | ............... | H01M 10/425 |
| 2021/0242712 A1* | 8/2021 | Izawa | ................... | B60R 16/033 |
| 2022/0017107 A1* | 1/2022 | Shinoda | .......... | B60W 60/00186 |

* cited by examiner

POWER SUPPLY SYSTEM

CROSS REFERENCE TO RELATED APPLICATION

The present application is based on and claims the benefit of priority of Japanese Patent Application No. 2021-067358, filed on Apr. 12, 2021, the disclosure of which is incorporated herein by reference.

TECHNICAL FIELD

The present disclosure generally relates to a power supply system.

BACKGROUND INFORMATION

A comparative power supply system supplies electric power to a first load group and a second load group of a vehicle from a first power supply unit and a second power supply unit, respectively. In such power supply system, when one of the first power supply unit and the second power supply unit is short-circuited, the electric power from the other of the power supply units is supplied to both of the first load group and the second load group.

SUMMARY

It is an object of the present disclosure to provide a power supply system having high fail-safe characteristics.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Hereinafter, multiple embodiments will be described with reference to the drawings. It should be noted that the same reference numerals are assigned to corresponding components in the respective embodiments, and overlapping descriptions may be omitted. Further, when only a part of a configuration is described in respective embodiments, the configuration of the other embodiment(s) described before can be applied to the other parts of such a configuration. Further, not only the combination of the configurations specified in the description of each of the embodiments but also the configuration of a plurality of embodiments can be partially combined even if the combination is not explicitly described.

Figure 1:
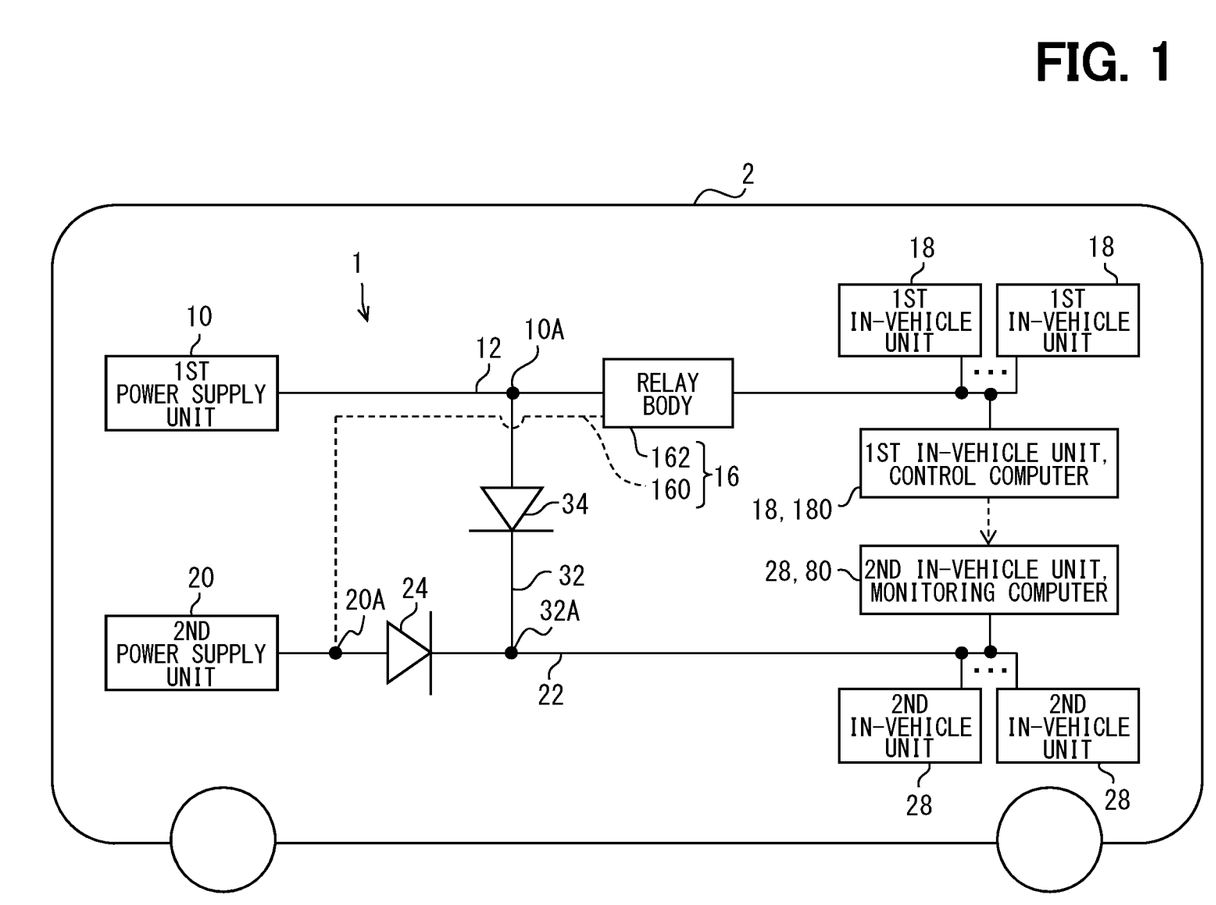
FIG. 1 is a block diagram showing an overall configuration of a power supply system according to a first embodiment.

A power supply system 1 of the first embodiment shown in FIG. 1 is mounted on a vehicle 2. The vehicle 2 is given (i.e., driven by) an automatic driving mode either temporarily by switching to and from a manual driving mode, or steadily/continuously without such switching being substantially performed. The automatic driving mode may be realized by automatic/autonomous driving control in which the operating system performs all driving tasks, such as conditional operation automation, advanced operation automation, or full operation automation. The automatic driving mode may be realized by advanced driving support control in which an occupant performs some or all driving tasks such as driving assistance or partial driving automation. The automatic driving mode may be realized by combining or switching between the automatic driving control and the advanced driving support control.

The power supply system 1 includes power supply units 10, 20, supply lines 12, 22, crossover line 32, rectifiers 24, 34, a relay unit 16, and in-vehicle units 18, 28.

The first power supply unit 10 constitutes a DC electric power supply by, for example, a combination of a lithium ion battery, or a lithium ion battery and a transformer. The first power supply unit 10 stores electric power that can be output to a first supply line 12 by discharging while the vehicle 2 is starting up. The first power supply unit 10 may be charged from the outside while the vehicle 2 is stopped to store electric power to the first supply line 12. The first power supply unit 10 may receive internal electric power generation during the start-up of the vehicle 2 and store the electric power to the first supply line 12.

The second power supply unit 20 constitutes a DC electric power supply having substantially the same voltage (during normal conditions) as the first power supply unit 10 by, for example, a combination of a lithium ion battery or a lithium ion battery and a transformer. The second power supply unit 20 stores electric power that can be output to a second supply line 22 by discharging during the start-up of the vehicle 2. The second power supply unit 20 may be charged from the outside while the vehicle 2 is stopped to store electric power to the second supply line 22. The second power supply unit 20 may receive internal electric power generation during the start-up of the vehicle 2 and store the electric power to the second supply line 22.

The first supply line 12 includes a first power node 10A, and constitutes a DC electric line by, for example, a wire harness or the like. The first supply line 12 crawls, or meanders, inside of at least one of the vehicle 2 and its mounted module. The first supply line 12 electrically connects the first power supply unit 10 and the plurality of first in-vehicle units 18. While the vehicle 2 is starting up, the electric power stored in the first power supply unit 10 is supplied to the first supply line 12 as an output of a set voltage (for example, 12V or the like). The output electric power from the first power supply unit 10 is supplied to each first in-vehicle unit 18 by the first supply line 12. Further, according to the configuration described later, the output electric power from the first power supply unit 10 can be supplied to a plurality of second in-vehicle units 28 by passing via the lines 12, 32, and 22.

The second supply line 22 includes a second power node 20A and a crossover node 32A. The second power supply line constitutes a DC electric line by, for example, a wire harness or the like. The second supply line 22 crawls, or meanders, inside of at least one of the vehicle 2 and its mounted module. The second supply line 22 electrically connects the second power supply unit 20 and the plurality of second in-vehicle units 28. While the vehicle 2 is starting up, the electric power stored in the second power supply unit 20 is supplied to the second supply line 22 as an output of substantially the same set voltage (for example, 12V) as in case of the first power supply unit 10. The output electric power from the second power supply unit 20 is supplied to each of the second in-vehicle units 28 by the second supply line 22.

A crossover line 32 constitutes a DC electric line by, for example, a wire harness or the like. The crossover line 32 crawls, or meanders, inside of at least one of the vehicle 2 and its mounted module. The crossover line 32 electrically connects (i) a middle portion between the first power supply unit 10 and all the first in-vehicle units 18 on the first supply line 12, and (ii) a middle portion between the second power supply unit 20 and all the second in-vehicle units 28 on the second supply line 22. As a result, the crossover line 32 relays electric power between the first supply line 12 and the second supply line 22 so as to be able to supply electric power. In particular, the crossover line 32 can transfer the output electric power from the first power supply unit 10 from the first supply line 12 to the second supply line 22 by the configuration described later. In FIG. 1, the crossover line 32 begins at a first power node 10A and ends at a crossover node 32A.

A power supply rectifier 24 constitutes a DC rectifier by, for example, a rectifying diode or the like. The power supply rectifier 24 is provided on the second supply line 22 in a middle portion, which is on a second power supply unit 20 side of a connection portion with the crossover line 32. The power supply rectifier 24 sets a rectification direction of electric current, which is an electric power supply direction, from a second power supply unit 20 side toward each of second in-vehicle unit 28 sides. As a result, on the second supply line 22, the supply of electric power in a current backflow state from each of second in-vehicle units 28 sides to a second power supply unit 20 side is regulated/restricted.

A crossover rectifier 34 constitutes a DC rectifier by, for example, a rectifying diode or the like. The crossover rectifier 34 is provided in the middle portion of the crossover line 32 between the first supply line 12 and the second supply line 22. The crossover rectifier 34 sets a rectification direction of electric current, which is an electric power supply direction, from a first supply line 12 side to a second supply line 22 side. As a result, on the crossover line 32, the supply of electric power in an electric current backflow state from a second supply line 22 side to a first supply line 12 side is regulated/restricted.

The relay unit 16 has a relay control line 160 and a relay body 162. The relay control line 160 constitutes a DC electric line by, for example, a wire harness or the like. The relay control line 160 crawls, or meanders, inside of at least one of the vehicle 2 and its mounted module. The relay control line 160 electrically connects a middle portion on a second power supply unit 20 side of the power supply rectifier 24 and the relay body 162 on the second supply line 22. A voltage within an allowable range is applied to the relay control line 160 according to the supply of electric power from the second power supply unit 20 to the second supply line 22. On the other hand, when the supply of electric power from the second power supply unit 20 to the second supply line 22 is interrupted due to an abnormality such as a failure in the second power supply unit 20 or insufficient storage of electricity, an application voltage to the relay control line 160 drops to a voltage outside the allowable range, such as 0V or the like. Here, the allowable range for the voltage applied to the relay control line 160 is set to a range (i) including a set voltage of the electric power supplied from the second power supply unit 20, but not including a maximum voltage dropped in response to the interruption of the supply of electric power from the second power supply unit 20.

The relay body 162 constitutes a contact type DC relay by, for example, a mechanical relay or the like. The relay body 162 is provided on the first supply line 12 in a middle portion on a first in-vehicle unit 18 side of the connection portion with the crossover line 32. The relay body 162 switches a contact on the first supply line 12 between the closed state and the open state according to a voltage applied from the second supply line 22 to the relay control line 160.

Specifically, when a normal voltage within the allowable range is normally applied to the relay control line 160 during the start-up of the vehicle 2 (i.e., during a normal time), the relay body 162 closes the contact on the first supply line 12. On the other hand, when an abnormal voltage that drops out of the allowable range is applied to the relay control line 160 during the start-up of the vehicle 2, the relay body 162 opens the contact on the first supply line 12. With the above configuration, when a normal electric power supply from the second power supply unit 20 to the second supply line 22 is interrupted due to occurrence of an abnormality, the relay unit 16 switches the first supply line 12 from the closed state to the open state. In other words, the relay body 162 is normally open (OFF), and closes (ON) when a normal voltage is supplied by the relay control line 160 from a second power node 20A.

The plurality of first in-vehicle units 18 are mounted inside at least one of the vehicle 2 and its mounted module. At least two of the first in-vehicle units 18 are arranged at the same location, or at least two of the first in-vehicle units 18 are arranged at different locations. Each first in-vehicle unit 18 is selected from among the in-vehicle devices responsible for driving the vehicle 2, i.e., more specifically from among the in-vehicle devices having a lower priority of electric power supply than all the second in-vehicle units 28. The first in-vehicle units 18 having such a low(er) priority includes, at least one control computer 180 (e.g., an automatic driving computer or the like) that controls the driving of the vehicle 2, and at least one sensor device (e.g., a camera for omnidirectional sensing, LiDAR, radar, etc.) that provides sensing information for the driving control.

Each first in-vehicle unit 18 is connected to the first supply line 12. The control computer 180 among the first in-vehicle unit 18 stops functioning due to switching from the closed state to the open state of the first supply line 12 at the time of abnormality. Due to such stop of function, the control computer 180 stops the driving control of the vehicle 2. Therefore, the control computer 180 outputs a life-and-death determination signal indicating the stop of functioning as a fallback function prior to the stop of functioning in response to the switching from the closed state to the open state of the first supply line 12. On the other hand, the control computer 180 outputs a life-and-death determination signal indicating a normal functional state in/during a normal time in contrast to such an abnormal time. In other words, the control computer 180 outputs a normal signal to the monitoring computer 280 when, at a minimum, a normal voltage is received from the first power supply unit 10 through the relay body 162. Further, the control computer 180 outputs an abnormal signal to the monitoring computer 280 when, a low voltage (or no voltage) is received from the first power supply unit 10 through the relay body 162, or when some other abnormal condition is detected by the control computer 180.

The second in-vehicle unit 28 is mounted inside at least one of the vehicle 2 and its mounted module. At least two of the second in-vehicle units 28 are arranged at the same location, or at least two of the second in-vehicle units 28 are arranged at different locations. Each of the second in-vehicle units 28 is selected from among the in-vehicle devices responsible for driving the vehicle 2, i.e., more specifically from among the in-vehicle devices having a higher priority of electric power supply than all the first in-vehicle units 18. The second in-vehicle unit 28 having such a higher priority includes (i) at least one monitoring computer 280 (e.g., a fallback computer, etc.) that monitors at least the control computer 180 among the first in-vehicle units 18, and substitutes for the control computer in the event of an abnormality, and (ii) at least one sensor device (e.g., a camera for forward sensing, radar, etc.) that provides minimum-requirement sensing information for such a substitute/fallback operation.

Each second in-vehicle unit 28 is connected in parallel to the second supply line 22. Of the second in-vehicle unit 28, the monitoring computer 280 is communicably connected to the control computer 180 via, for example, an internal bus, a LAN or the like. The monitoring computer 280 receives the life-and-death determination signal from the control computer 180. The monitoring computer 280 monitors the state of the control computer 180 based on the received life-and-death determination signal. As a result, when the monitoring target control computer 180 stops functioning abnormally, i.e., in the abnormal time, the monitoring computer 280 substitutes/replaces the function-stopped control computer 180. At such timing, the monitoring computer 280 continues the driving control of the vehicle 2 by degrading in response to the function stop of the control computer 180.

Here, the degrading of the driving control may be an MRM in which the vehicle 2 continues its travel to a safe place in the automatic driving mode, i.e., to a place where the vehicle 2 is safely stoppable in a minimum required maneuver or MRM. Alternatively, the degrading of the driving control may be an advanced driving support in which the automatic driving of the vehicle 2 is handed over to the manual driving by the occupant, after which the manual driving is controllably supported, by providing the degrading notification to the occupant in the automatic driving mode. On the other hand, during the normal time with respect to/in contrast to such an abnormal time, the monitoring computer 280 monitors the driving control by the control computer 180 based on, for example, a safety model.

The operation of the power supply system 1 described so far will now be described.

Figure 2:
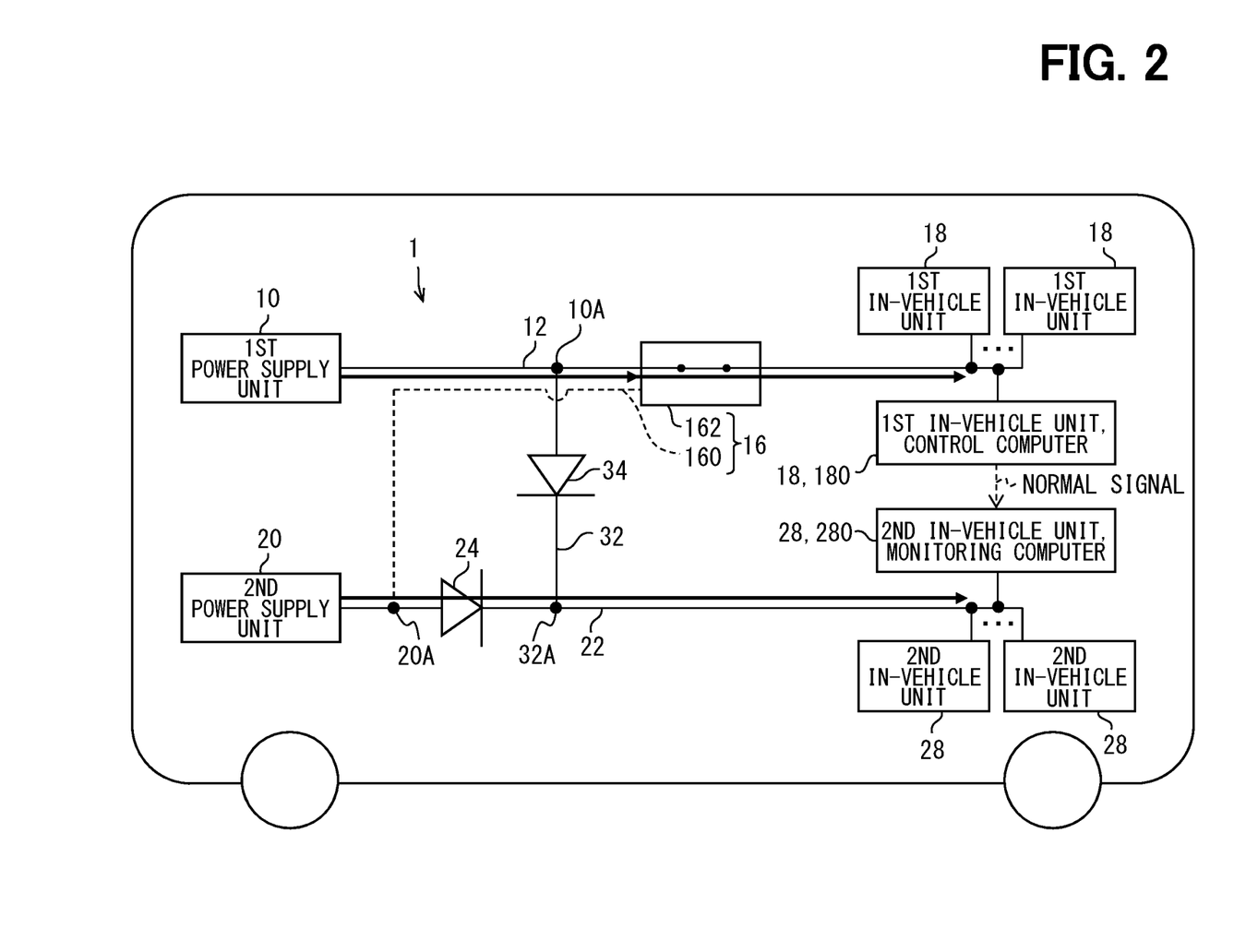
FIG. 2 is a block diagram for explaining an operation of the power supply system according to the first embodiment.

FIG. 2 shows a normal time (normal condition), with the relay body 162 closed (ON), and the control compute 180 sending a normal signal to the monitoring computer 280. Suring the normal time of the vehicle 2, in which the supply of electric power from the second power supply unit 20 to the second supply line 22 is normal/appropriate in the start-up time of the vehicle 2, a normal voltage within the allowable range is applied to the relay control line 160, and the relay unit 16 keeps the first supply line 12 in the closed state. As a result, the output electric power from the first power supply unit 10 is supplied to each of the first in-vehicle units 18 via the first supply line 12, while the output electric power from the second power supply unit 20 is supplied to each of second in-vehicle units 28 via the second supply line 22. Further, in addition to such a potential level, the backflow regulation in the crossover rectifier 34 also limits the supply of electric power from the second supply line 22 to the first supply line 12 via the crossover line 32.

In such a normal time, the control computer 180 of the first in-vehicle unit 18 functions normally to control the driving of the vehicle 2. At such timing, since the life-and-death (determination) signal from the control computer 180 indicates a normal functional state, the monitoring computer 280 of the second in-vehicle unit 28 monitors the driving control by the control computer 180. Specifically, a normal signal is sent from the control computer 180 to the monitoring computer 280.

Figure 3:
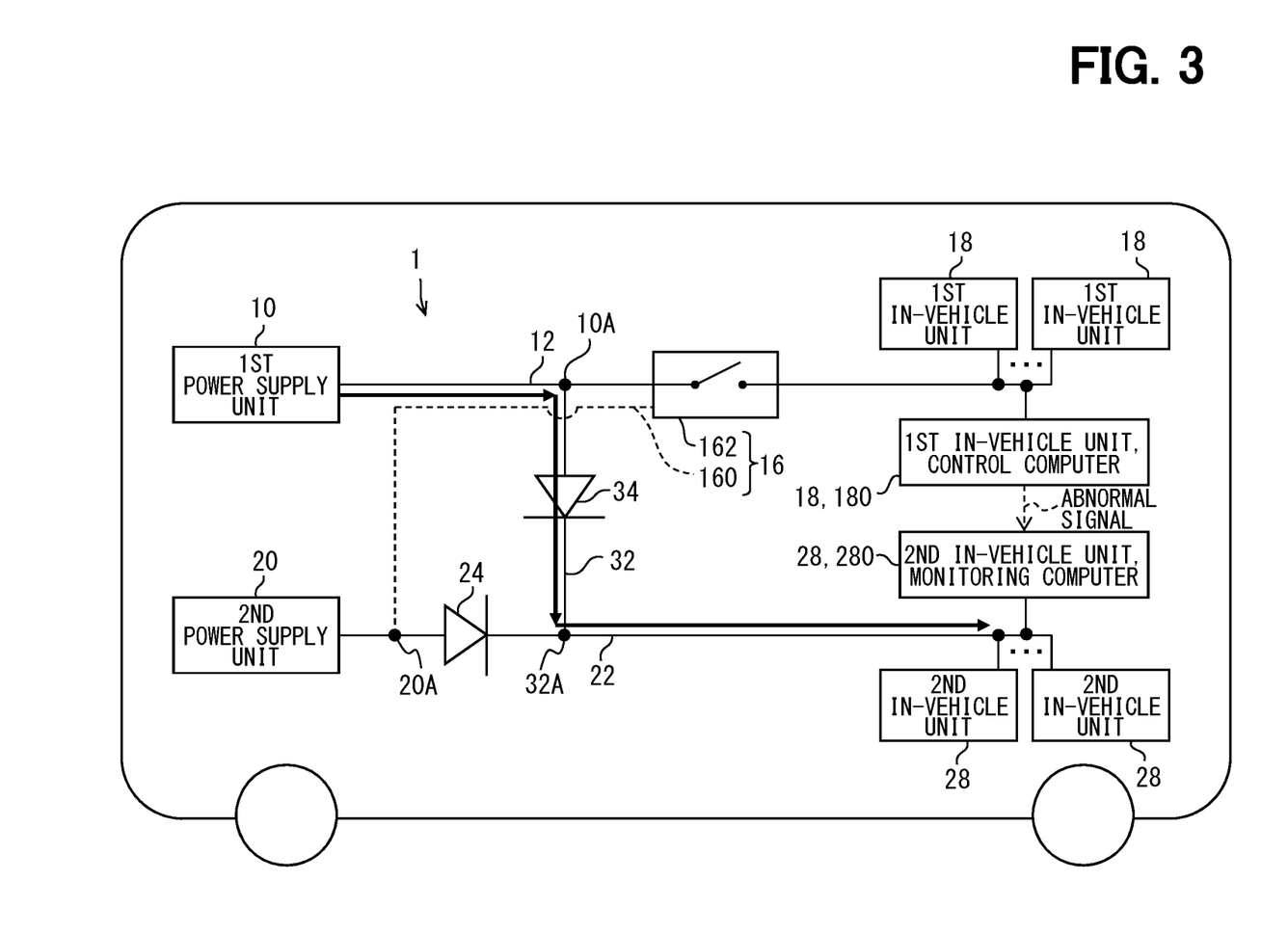
FIG. 3 is a block diagram for explaining the operation of the power supply system according to the first embodiment.

As shown in FIG. 3, when the supply of electric power from the second power supply unit 20 to the second supply line 22 is interrupted during the start-up of the vehicle 2, an abnormal voltage outside the allowable range is applied to the relay control line 160, and the relay unit 16 switches the first supply line 12 from the closed state (ON) to the open state (OFF). As a result: (i) supply of the output electric power from the first power supply unit 10 to each of the first in-vehicle units 18 via the first supply line 12 is stopped, and (ii) the output electric power from the first power supply unit 10 is provided to each of the second in-vehicle units 28 via the crossover line 32 and the second supply line 22. At such timing, the supply of electric power from the first supply line 12 to the second power supply unit 20 via the crossover line 32 is blocked by the power supply rectifier 24.

At the time of such an abnormality, the control computer 180 of the first in-vehicle unit 18 stops functioning. Prior to the stop of the control computer 180, since the life-and-death determination signal from the control computer 180 indicates stop of functioning, the monitoring computer 280 of the second in-vehicle unit 28 substitutes/replaces the driving control of the vehicle 2 by the control computer 180 by performing the degrading of the control. In other words, an abnormal signal (indicating at least one abnormality detected by the control computer 180) is sent to the monitoring computer 280.

Operation and Effects

The operation and effects of the first embodiment described above will be explained in the following.

According to the first embodiment, when the supply of electric power from the second power supply unit 20 to the second supply line 22 is interrupted, the relay unit 16 in the first supply line 12 on a first in-vehicle unit 18 side of the crossover line 32 switches the first supply line 12 from the closed state to the open state. As a result, between the first supply line 12 and the second supply line 22, via the crossover line 32 having a rectification direction from the first supply line 12 side to the second supply line 22 side set by the crossover rectifier 34, the electric power from the power supply unit 10 is supplied to the second in-vehicle unit 28. At such timing, on the second supply line 22, the power supply rectifier 24 on a second power supply unit 20 side of the crossover line 32 sets a rectification direction from the second power supply unit 20 side to the second in-vehicle unit 28 side, thereby capable of avoiding a backflow situation in which the electric power flows from the first power supply unit 10 to the second power supply unit 20.

From another viewpoint, in the first embodiment, when the supply of electric power from the second power supply unit 20 to the second supply line 22 is interrupted, the first supply line 12 is switched from the closed state to the open state. As a result, the electric power from the first power supply unit 10 is supplied to the second in-vehicle unit 28 via the crossover line 32 that rectifies while supplying electric power from the first supply line 12 to the second supply line 22. At such timing, on the second supply line 22 which is capable of supplying electric power from the second power supply unit 20 to the second in-vehicle unit 28 while performing rectification, the situation where the electric power from the first power supply unit 10 flows back to the second power supply unit 20 is avoided.

According to the first embodiment described above, from among the first in-vehicle unit 18 and the second in-vehicle unit 28 that are responsible for driving the vehicle 2, electric power from the first power unit 10 is supplied only to the latter having high priority of electric power supply in terms of driving the vehicle 2. Therefore, the operation of the second in-vehicle unit 28, which has a higher priority, can be continued for as long as possible by the supply of electric power from the first power supply unit 10, and the driving of the vehicle 2 is continued, thereby high fail-safe characteristics are achievable.

According to the first embodiment, on the second supply line 22, the relay unit 16 connected on the second power supply unit 20 side of the power supply rectifier 24 opens the first supply line 12 in response to the drop of the application voltage to the relay unit 16 by the supply of electric power from the second power supply unit 20 to the second supply line 22 out of the allowable range. According to the above, the first supply line 12 is switched to the open state in a timely manner as the supply of electric power to the second supply line 22 is interrupted. Therefore, it is possible to contribute to the exertion of high fail-safe characteristics.

According to the first embodiment, the second in-vehicle unit 28, in contrast to the first in-vehicle unit 18 including the control computer 180 that controls the driving of the vehicle 2, includes the monitoring computer 280 that substitutes the control computer 180 when the control computer 180 as a monitoring target stops functioning. According to the above, even if the supply of electric power from the second power supply unit 20 is interrupted, the driving control of the vehicle 2 can be continued by the monitoring computer 280 having a higher priority of receiving electric power supply than the control computer 180. Therefore, it is possible to contribute to the exertion of high fail-safe characteristics.

According to the first embodiment, in response to the stop of functioning of the control computer 180 included in the first in-vehicle unit 18 according to the switching of the first supply line 12 to the open state, the monitoring computer 280 included in the second in-vehicle unit 28 performs degrading of the driving control of the vehicle 2. According to the above, even if the supply of electric power from the second power supply unit 20 is interrupted, the monitoring computer 280, which has a higher priority of receiving electric power supply than the control computer 180, is capable of causing the vehicle 2 to be in a state of degrading while continuing the driving control. Therefore, it is possible to exhibit high fail-safe characteristics while suppressing electric power consumption due to continuation of the driving control.

Second Embodiment

Figure 4:
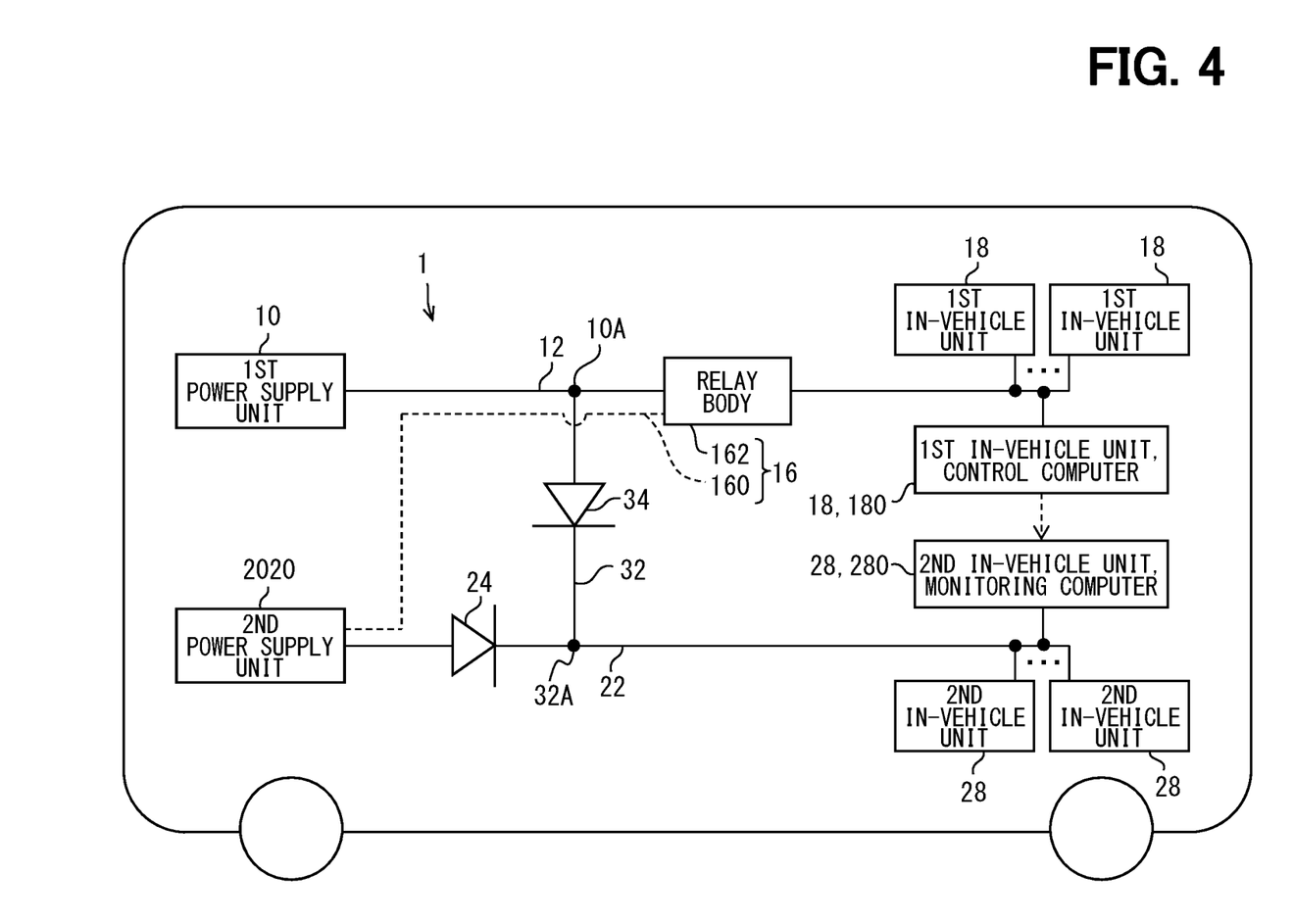
FIG. 4 is a block diagram showing an overall configuration of the power supply system according to a second embodiment.

The second embodiment shown in FIG. 4 is a modification of the first embodiment.

In the power supply system 1 of the second embodiment, the relay control line 160 of the relay unit 16 is electrically connected to a second power supply unit 2020. In the second power supply unit 2020, the supply of electric power to the second supply line 22 is self-detected. As a result, the second power supply unit 2020 is designed so that the voltage applied from the second power supply unit 2020 to the relay control line 160 is (i.e., stays) within the allowable range while the self-detection state by the second power supply unit 2020 is a normal supply state. On the other hand, the second power supply unit 2020 is designed so that the voltage applied from the second power supply unit 2020 to the relay control line 160 is (i.e., gets) out of the allowable range when the self-detection state by the second power supply unit 2020 is an interrupted state.

In one specific example of the second embodiment, the relay control line 160 may simply provide a logic signal (such as 5 volts) from the second power supply 2020 to the relay unit 162 when the second power voltage is normal to close (turn ON) the relay unit 162. In this specific example, the relay control line may provide a different logic signal (such as 0 volts) from when the second power voltage is abnormal (low) to open (turn OFF) the relay unit 162.

According to the above-described second embodiment, the relay unit 16 connected to the second power supply unit 2020 opens (turns OFF) path of the first supply line 12 to the first in-vehicle units 18, in response to an interrupted state that is detected as the self-detection state by the second power supply unit 2020 regarding the supply of electric power to the second supply line 22. According to the above, the first supply line 12 is switched to the open state in a timely manner as the interrupted state of the supply of electric power is self-detected by the second power supply unit 2020. Therefore, it is possible to contribute to the exertion of high fail-safe characteristics.

Third Embodiment

Figure 5:
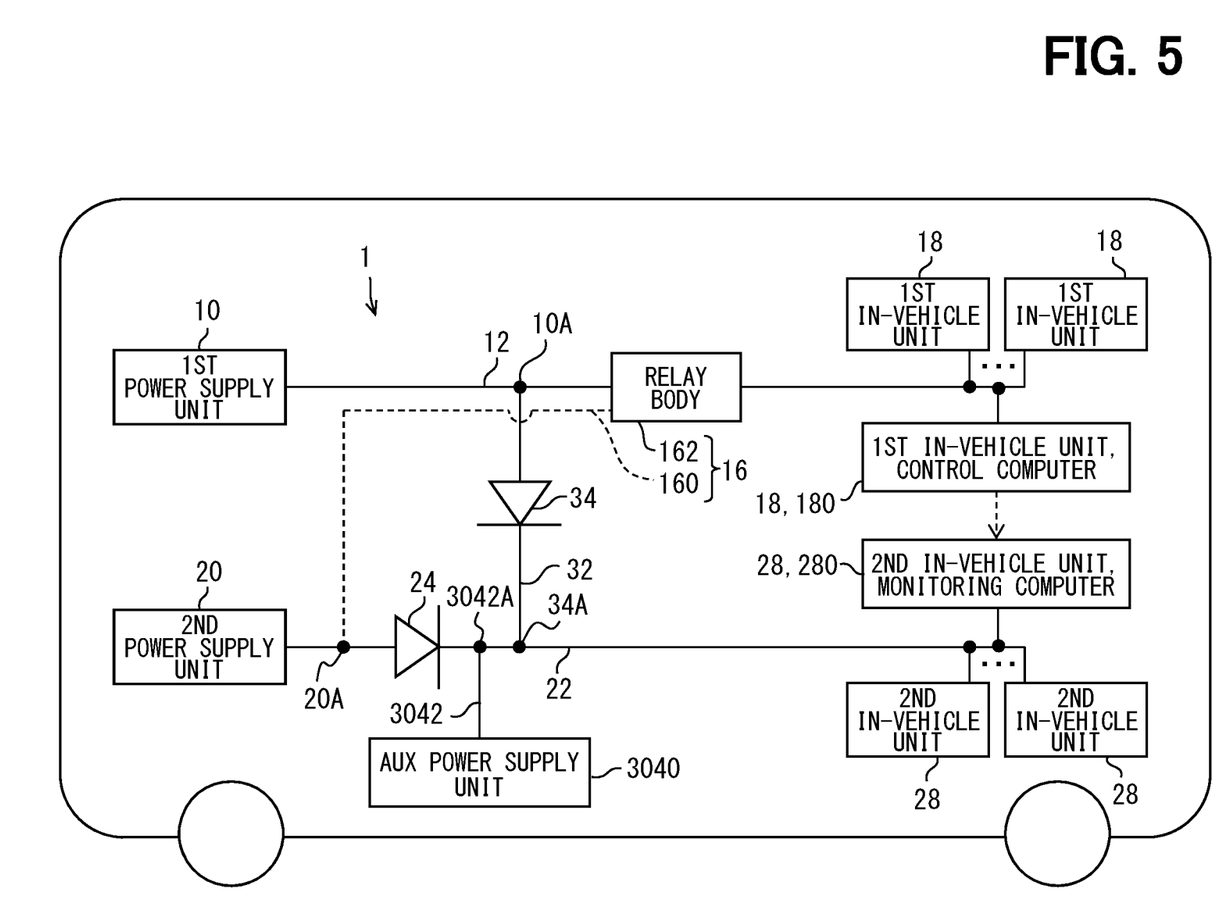
FIG. 5 is a block diagram showing an overall configuration of the power supply system according to a third embodiment.

As shown in FIG. 5, the third embodiment is a modification of the first embodiment.

An auxiliary power supply unit 3040 and an auxiliary supply line 3042 are added to the power supply system 1 of the third embodiment. The auxiliary power supply unit 3040 constitutes a standby power supply having substantially the same voltage as the supply of power supply units 10 and 20 by using, for example, a storage battery or a lithium ion battery. The auxiliary power supply unit 3040 stores electric power that can be output to the second supply line 22 by discharging during the start-up of the vehicle 2. The auxiliary power supply unit 3040 may receive internal electric power generation during the start-up of the vehicle 2 for storing the electric power to the second supply line 22.

The auxiliary power supply unit 3040 is electrically connected to a middle portion, on the second supply line 22, between the connection portion of the crossover line 32 and the rectifier 24 via the auxiliary supply line 3042. Here, the auxiliary supply line 3042 constitutes an auxiliary electric line by, for example, a wire harness or the like. The electric power stored in the auxiliary power supply unit 3040 during the start-up of the vehicle 2 is suppliable, as the output of the set voltage (for example, 12 V or the like) substantially the same as that of the supply of power supply units 10 and 20, sequentially to the second supply line 22 and each of the second in-vehicle unit 28.

Figure 6:
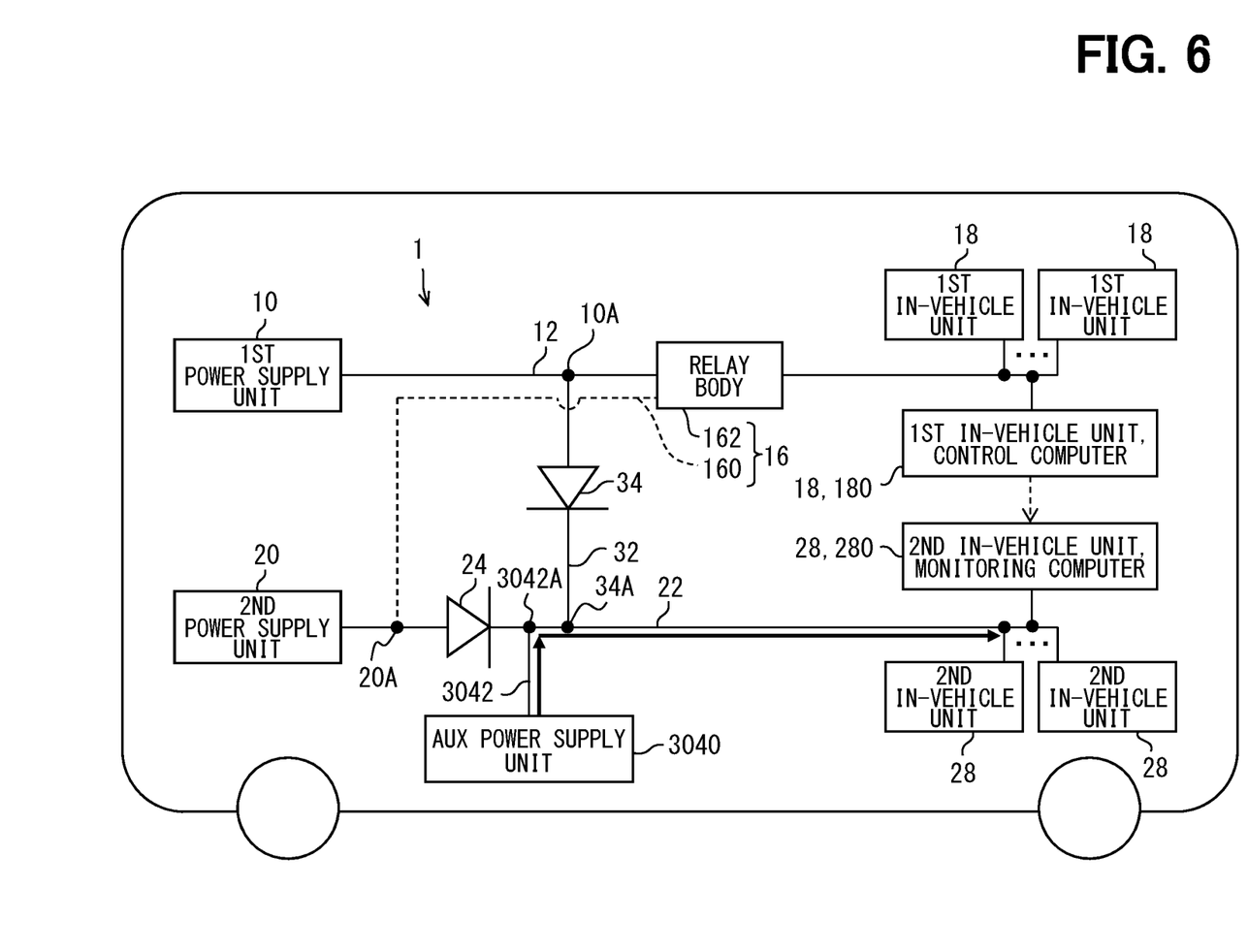
FIG. 6 is a block diagram for explaining the operation of the power supply system according to the third embodiment.

When the supply of electric power from the second power supply unit 20 to the second supply line 22 is interrupted during the start-up of the vehicle 2 in the third embodiment having such a configuration, the output electric power from the first power supply unit 10 according to the first embodiment is supplied to each second in-vehicle unit 28. Under such electric power supply, when the monitoring computer 280 of the second in-vehicle units 28 is substitutively used for the degrading and continuing the driving control of the vehicle 2, the electric power supplied from the first power supply unit 10 is consumed by each of the second in-vehicle units 28. As a result, when shortage of the electric power supplied from the first power supply unit 10 occurs and the voltage drops, the output electric power from the auxiliary power supply unit 3040 is in turn supplied from the auxiliary supply line 3042 to each of the second in-vehicle units 28 via the second supply line 22 as shown in FIG. 6. While the output electric power from the auxiliary power supply unit 3040 is supplied to each of the second in-vehicle units 28 in such manner, the monitoring computer 280 of one of the second in-vehicle units 28 is enabled to continue the function of substituting the driving control of the vehicle 2 for degrading (i.e., for degraded but continued control). The auxiliary supply line 3042 connects to the second power supply line at an auxiliary power node 3042A.

According to the above-described third embodiment, the auxiliary power supply unit 3040 for supplying electric power to the second supply line 22 is connected at an auxiliary power node 3042A (located between the rectifier 24 and the crossover line 32 on the second supply line 22). According to the above, for the second in-vehicle unit 28 after interruption of the supply of electric power from the second power supply unit 20, even if the electric power from the first power supply unit 10 is interrupted, the auxiliary power supply unit 3040 enables the continuing supply of electric power. Therefore, it is possible to exhibit high fail-safe characteristics by the triple redundant system that provides extended time of operation for the vehicle 2.

Fourth Embodiment

Figure 7:
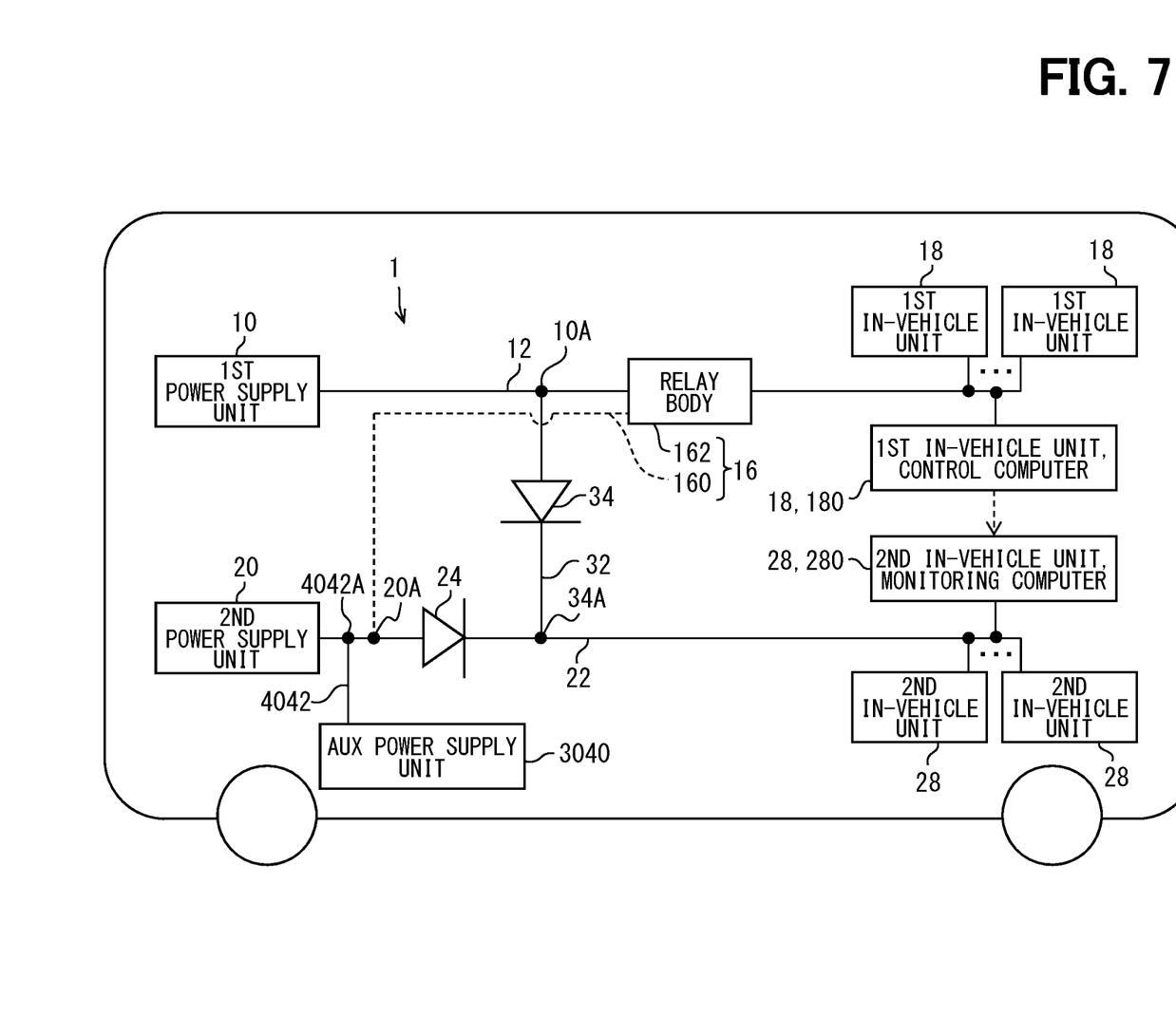
FIG. 7 is a block diagram showing an overall configuration of the power supply system according to a fourth embodiment.

As shown in FIG. 7, the fourth embodiment is a modification of the third embodiment.

In the power supply system 1 of the fourth embodiment, an auxiliary supply line 4042 connects the auxiliary power supply unit 3040 to a middle part between the second power supply unit 20 and the rectifier 24 on the second supply line 22.

Figure 8:
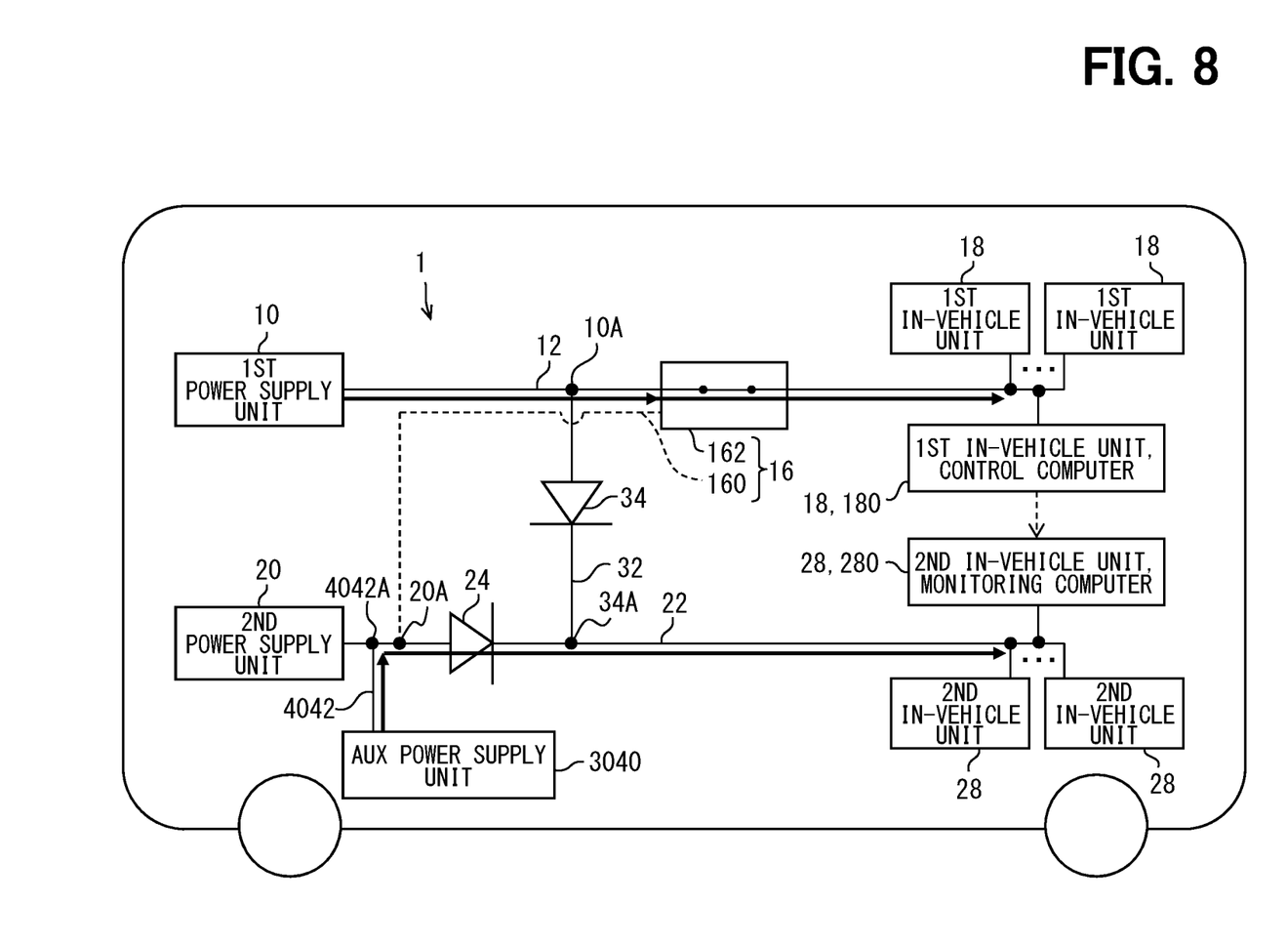
FIG. 8 is a block diagram for explaining the operation of the power supply system according to the fourth embodiment.

When the supply of electric power from the second power supply unit 20 to the second supply line 22 is interrupted during the start-up of the vehicle 2 in the fourth embodiment having such a configuration (i.e., in an abnormal time), the auxiliary power supply unit 3040 is used as shown in FIG. 8 for supplying the output electric power from the auxiliary supply line 4042 to the second supply line 22. At such timing, the relay unit 16 keeps the first supply line 12 in the closed state by an application of the normal voltage within the allowable range to the relay control line 160. As a result, the output electric power from the auxiliary power supply unit 3040 is supplied to each of the second in-vehicle units 28 via the second supply line 22. While the output electric power from the auxiliary power supply unit 3040 is supplied to each of the second in-vehicle units 28, the output electric power from the first power supply unit 10 continues to be supplied to each of the first in-vehicle units 18 via the closed first supply line 12. In such manner, the control computer 180 of the first in-vehicle unit 18 functions normally without stopping the function, and the monitoring computer 280 of the second in-vehicle unit 28 continues to monitor the driving control by the control computer 180.

Thereafter, the supply of electric power to each of the second in-vehicle units 28 is continued, and, when the voltage drops due to shortage of electric power from the auxiliary power supply unit 3040, an abnormal voltage outside the allowable range is applied to the relay control line 160, which triggers switching of the relay unit 16, i.e., switching the first supply line 12 to the open state. As a result, in turns, the output electric power from the first power supply unit 10 is supplied to each of the second in-vehicle units 28 according to the first embodiment. In such manner, the output electric power from the first power supply unit 10 is supplied to each of the second in-vehicle units 28, so that the monitoring computer 280 of the second in-vehicle unit 28 is substitutively used for degrading and continuing the driving control of the vehicle 2.

According to the above-described fourth embodiment, the auxiliary power supply unit 3040 for supplying electric power to the second supply line 22 is connected to a position between the second power supply unit 20 and the rectifier 24 on the second supply line 22. According to the above, even if the supply of electric power from the second power supply unit 20 is interrupted, the supply of electric power from the auxiliary power supply unit 3040 to the second supply line 22 keeps the first supply line 12 in the closed state. Further, for the second in-vehicle unit 28, even if the electric power from the auxiliary power supply unit 3040 is consumed and then is exhausted, the first supply line 12 is in turn switched to the open state (i.e., the power from the first supply line 12 kicks in), for continuing the supply of electric power from the first power supply unit 10. Therefore, it is possible to extend the time before degrading the driving control of the vehicle 2 and to exhibit high fail-safe characteristics.

Other Embodiments

Although multiple embodiments have been described above, the present disclosure is not construed as being limited to those embodiments, and can be applied to various embodiments and combinations within a scope that does not depart from the spirit of the present disclosure.

In a modified example, the relay body 162 of the relay unit 16 may form a non-contact type DC relay by, for example, a semiconductor relay or the like. In another modified example, the first in-vehicle unit 18 may be a single unit such as only the control computer 180. In yet another modified example, the second in-vehicle unit 28 may be a single unit such as only the monitoring computer 280. In yet another modified example, the second power supply unit 2020 of the second embodiment may be applied to the third and fourth embodiments.

What is claimed is:
1. A power supply system comprising:
 a first in-vehicle unit and a second in-vehicle unit both involved in driving a vehicle, wherein electric power is normally supplied respectively from a first power supply unit and a second power supply unit to the first in-vehicle unit and the second in-vehicle unit, among which the second in-vehicle unit has a higher priority of receiving supply of electric power than the first in-vehicle unit;
 a first supply line normally supplying electric power from the first power supply unit to the first in-vehicle unit;
 a second supply line normally supplying electric power from the second power supply unit to the second in-vehicle unit;

a crossover line relaying electric power from the first supply line to the second supply line to be able to supply electric power under abnormal conditions;

a power supply rectifier provided on a second power supply unit side of the crossover line on the second supply line and configured to pass power to the second in-vehicle unit;

a crossover rectifier provided on the crossover line and configured to pass power from the first supply line side to the second supply line; and a relay unit provided on a first in-vehicle unit side of the crossover line, and configured to switch from a closed state to an open state when a supply of electric power from the second power supply unit to the second supply line is interrupted, wherein the second supply line is connected to the crossover line between the crossover rectifier and the second in-vehicle unit, and the crossover line electrically connects (i) a middle portion between the first power supply unit and the first in-vehicle unit on the first supply line, and (ii) a middle portion between the second power supply unit and the second in-vehicle unit on the second supply line.

2. The power supply system of claim 1, wherein the relay unit is connected, via a relay control line, to a second power supply unit side position of the power supply rectifier on the second supply line, and the relay unit is configured to open when a relay control line voltage drops out of an allowable range.

3. The power supply system of claim 1, wherein the relay unit is connected to the second power supply unit, and opens the first supply line when a self-detection state of the supply of electric power to the second supply line by the second power supply unit is detected as an interrupted state.

4. The power supply system of claim 1 further comprising an auxiliary power supply unit connected to a position between a supply rectification element and the crossover line on the second supply line to supply electric power to the second supply line.

5. The power supply system of claim 1 further comprising an auxiliary power supply unit connected to a position between the second power supply unit and a supply rectification element on the second supply line to supply electric power to the second supply line.

6. The power supply system of claim 1, wherein the first in-vehicle unit includes a control computer that controls driving of the vehicle, and the second in-vehicle unit includes a monitoring computer that substitutes for the control computer when the control computer stops functioning.

7. The power supply system of claim 6, wherein the control computer is configured to stop functioning due to switching of the relay unit from the closed state to the open state, and the monitoring computer is configured to degrade driving control in response to the stop of functioning of the control computer.

8. The power supply system of claim 1, wherein the crossover line branches from a first power node of the first supply line to the second supply line, and the relay unit is located between the first power node and the first in-vehicle unit.

9. The power supply system of claim 8, wherein the crossover line branches from a second power node of the second supply line to the first supply line, and the power supply rectifier is located between the second power node and the second power supply unit.

10. The power supply system of claim 1, wherein the first in-vehicle unit is a control computer configured to control the driving of the vehicle, and the second in-vehicle unit is a monitoring computer configured to monitor the control computer and substitute for the control computer in event of an abnormality.

11. The power supply system of claim 1, wherein the crossover rectifier is configured to regulate electric power from the second supply line to the first supply line on the crossover line.

12. The power supply system of claim 1, wherein the crossover rectifier is configured to always prohibit electric power from the second supply line to the first supply line on the crossover line, and always allow electric power from the first supply line to the second supply line on the crossover line.

13. A power supply system comprising:

a first in-vehicle unit and a second in-vehicle unit both configured to drive a vehicle, wherein electric power is normally supplied respectively from a first power supply unit and a second power supply unit to the first in-vehicle unit and the second in-vehicle unit, among which the second in-vehicle unit has a higher priority of receiving supply of electric power than the first in-vehicle unit;

a first supply line configured to normally supply first electric power from the first power supply unit to the first in-vehicle unit;

a second supply line configured to normally supply second electric power from the second power supply unit to the second in-vehicle unit while performing rectification; and a crossover line configured to supply first electric power from the first supply line to the second supply line while performing rectification, wherein the crossover line electrically connects (i) a middle portion between the first power supply unit and the first in-vehicle unit on the first supply line, and (ii) a middle portion between the second power supply unit and the second in-vehicle unit on the second supply line, the second supply line is connected to the crossover line between a crossover rectifier and the second in-vehicle unit, the crossover rectifier provided on the crossover line and configured to pass power from the first supply line side to the second supply line, and when the second electric power from the second power supply unit to the second supply line is interrupted, the first supply line is switched from a closed state to an open state.

14. A power supply system comprising:
a first power supply unit providing a first voltage;
a first supply line including:
  (i) a first power node, and
  (ii) a relay body located downstream of the first power node;
a first in-vehicle unit;
a control computer;
a second power supply unit providing a second voltage;
a second supply line including:
  (i) a second power node,
  (ii) a power supply rectifier located downstream of the second power node, and
  (iii) a crossover node located downstream of the power supply rectifier;

a second in-vehicle unit;
a monitoring computer;
a crossover line beginning at the first power node, ending at the crossover node, and including a crossover rectifier; and
a relay control line configured to control the relay body, wherein, when the second voltage is normal:
(i) the relay control line is configured to close the relay body such that the first voltage reaches the control computer and the first in-vehicle unit; and
(ii) the second supply line is configured to pass the second voltage to the monitoring computer and to the second in-vehicle unit,
wherein the second supply line is connected to the crossover line between the crossover rectifier and the second in-vehicle unit, and
wherein the crossover line electrically connects (i) the first power node between the first power supply unit and the first in-vehicle unit on the first supply line, and (ii) the crossover node between the second power supply unit and the second in-vehicle unit on the second supply line, and
wherein, when the second voltage drops out of an allowable range:
(i) the relay control line is configured to open the relay body and block the first voltage from reaching the control computer and the first in-vehicle unit;
(ii) the crossover line is configured to pass the first voltage to the monitoring computer and to the second in-vehicle unit through the crossover rectifier, and
(iii) the power supply rectifier is configured to block the first voltage from reaching the second power supply.

15. The power supply system of claim 14, wherein:
the relay control line begins at the second power node, and supplies the second voltage to the relay body as a control signal to switch the relay body.

16. The power supply system of claim 14, wherein:
the relay control line begins at the second power supply unit,
the second power supply unit is configured to provide a control signal to the relay control line, and
the control signal is associated with the second voltage, such that the relay body is opened when the second voltage drops out of the allowable range.

17. The power supply system of claim 14, further comprising:
an auxiliary power supply unit connected to the second supply line.

18. The power supply system of claim 17, wherein the auxiliary power supply unit is connected to the second supply line downstream of the power supply rectifier.

19. The power supply system of claim 17, wherein the auxiliary power supply unit is connected to the second supply line upstream of the power supply rectifier.

20. The power supply system of claim 14,
wherein, when the second voltage drops out of the allowable range:
(iv) the control computer is configured to send an abnormal signal to the monitoring computer, and
(v) the monitoring computer, upon receiving the abnormal signal, is configured to control driving the vehicle in a degraded state.

21. The power supply system of claim 20,
wherein the degraded state includes performing a minimum risk maneuver (MRM).

22. The power supply system of claim 20,
wherein the degraded state includes, when the vehicle is in an automatic driving mode, transferring from the automatic driving mode to a manual driving mode, and
wherein the second in-vehicle unit is a forward sensor device.

* * * * *